United States Patent [19]

Katoh et al.

[11] Patent Number: 5,380,574
[45] Date of Patent: Jan. 10, 1995

[54] MATS AND RUGS AND PROCESS FOR PRODUCING THE SAME

[75] Inventors: Naoyuki Katoh, Mie; Takashi Fukushima, Toyama; Kenzou Ichihashi, Osaka, all of Japan

[73] Assignees: Mitsubishi Yuka Badische Co., Ltd, Yokkaichi; Diatex Co., Ltd., Tokyo, both of Japan

[21] Appl. No.: 992,035

[22] Filed: Dec. 17, 1992

[30] Foreign Application Priority Data

Dec. 18, 1991 [JP] Japan .................. 3-335048
Feb. 3, 1992 [JP] Japan .................. 4-017648

[51] Int. Cl.$^6$ .................................... B32B 3/02
[52] U.S. Cl. ................................ 428/92; 428/93; 428/94; 428/95
[58] Field of Search ............... 428/92, 93, 94, 95

[56] References Cited

U.S. PATENT DOCUMENTS

| | | | |
|---|---|---|---|
| 3,686,848 | 8/1972 | Miller et al. | 264/168 |
| 3,817,817 | 6/1974 | Pickens, Jr. et al. | 428/95 |
| 3,922,454 | 11/1975 | Roecker | 428/95 |
| 4,035,533 | 7/1977 | Chambley | 428/95 |
| 4,181,762 | 1/1980 | Benedyk | 428/92 |
| 4,239,563 | 12/1980 | Iacoviello | 156/72 |
| 4,356,220 | 10/1982 | Benedyk | 428/92 |
| 4,804,567 | 2/1989 | Reuben | 428/95 |
| 4,822,658 | 4/1989 | Pacione | 428/95 |
| 4,829,627 | 5/1989 | Altus et al. | 428/95 |
| 4,877,669 | 10/1989 | Endrenyi, Jr. et al. | 428/95 |

*Primary Examiner*—George F. Lesmes
*Assistant Examiner*—Terrel Morris
*Attorney, Agent, or Firm*—Sughrue, Mion, Zinn, Macpeak & Seas

[57] ABSTRACT

A mat or rug having a laminate structure is described composed of (A) a reverse side mat layer including (a) a laminated mat composed of ($a^1$) base fabric and ($a^2$) nonwoven fabric made of a thermoplastic resin fibrous binder, the base fabric ($a^1$) and nonwoven fabric ($a^2$) being united by needling, (b) cut piles made of a thermoplastic resin implanted from one side of the laminated mat (a), and (c) a resin adhesive layer formed by coating a liquid resin adhesive on the nonwoven fabric ($a^2$) on the side opposite to the cut piles (b) and drying, (B) a thermoplastic resin adhesive layer, and (C) a surface mat layer, wherein the surface mat layer (C) is adhered via the thermoplastic resin adhesive layer (B) to the reverse side mat layer (A) on the side of reverse side mat layer (A) on which the liquid resin adhesive has been coated, wherein the cut piles (b) are implanted under the following conditions:

Implanting density: 16 to 400 roots/in$^2$
Implanting pitch—gauge direction: 4 to 20 roots/in
stitch direction: 4 to 20 roots/in
Pile height: 2 to 20 mm
Pile thickness: 20 to 1000 μm
Pile fineness: 800 to 6000 denier.

18 Claims, 2 Drawing Sheets

MATS AND RUGS AND PROCESS FOR PRODUCING THE SAME

FIELD OF THE INVENTION

This invention relates to a mat or rug which does not slide when put on a carpet. More particularly, it relates to a mat or rug which does not slide even when put on the carpeted floor of automobiles, whose reverse side piles are prevented from falling off, and which prevents water from penetrating therethrough, and to a process for producing the same.

BACKGROUND OF THE INVENTION

The floor of an automobile is usually covered with a carpet for sound absorption, heat insulation and comfort. The automobile carpet is produced by heat and press molding of matting, for example a molding fibrous mat prepared by coating or impregnating an aqueous emulsion of a thermoplastic resin having a softening point of 100 to 130° C. on or in needled nonwoven fabric followed by drying or a nonwoven mat comprising high-melting fiber (e.g., polyethylene terephthalate fiber) and a thermoplastic resin fibrous binder having a melting point of 100 to 130° C., by using a mold in conformity with the floor shape.

A foot mat made of a polyvinyl chloride resin or a rubber material with a non-slip patterned back is usually put on the floor carpet of an automobile in order to prevent soiling of the floor carpet or to make cleaning easier.

The floors of houses, offices, hotels, etc. are similarly carpeted wall-to-wall. Since a gorgeous Oriental carpet called Dantsu or a shaggy carpet is very expensive, it is popular to cover the floor wall-to-wall with relatively cheap carpeting and to spread thereon a tufted rug, a shaggy rug, or a Dantsu rug. Even where an expensive carpet is laid all over the floor, a small-sized and replaceably inexpensive rug is usually put on parts which are easily soiled or damaged, such as at the doors of houses or buildings and under tables or desks.

However, such a rug put on a carpet is apt to slide out of the place and must be occasionally put back to the original position. This tendency becomes conspicuous as the piles of the carpet lengthen and as the frequency of passage on the rug increases.

The sliding of a floor mat similarly occurs in automobiles. The non-slip pattern of the back of the conventional mat is insufficient for preventing the mat under the driver's foot from sliding during driving. A mat with a fitment on the reverse thereof with which it is fixed to the floor has been proposed, but it is troublesome to take it apart for cleaning.

A floor mat slid out of the place not only makes a driver feel uncomfortable but also interferes with driving. Besides, soil brought in with shoes is scattered on the carpeted floor.

SUMMARY OF THE INVENTION

An object of the present invention is to provide a mat or rug (hereinafter inclusively referred to as a mat) which does not slide during use on a carpet.

Another object of the present invention is to provide a process for producing such a non-sliding mat.

The inventors have conducted extensive investigations and, as a result, found that the sliding of a mat on a carpet can be prevented by implanting pile yarns made of a rigid material into the reverse side of the mat at a proper pitch to a proper density so that the piles (cut piles) may stick into the pile layer of the carpet laid beneath and are not easily bent by a sliding force.

The present invention relates to a mat having a laminate structure composed of:

(A) a reverse side mat layer comprising (a) a laminated mat composed of ($a^1$) base fabric and ($a^2$) nonwoven fabric made of a thermoplastic resin fibrous binder, the base fabric ($a^1$) and nonwoven fabric ($a^2$) being united by needling, (b) cut piles made of a thermoplastic resin implanted from one side of the laminated mat (a), and (c) a resin adhesive layer formed by coating a liquid resin adhesive on the nonwoven fabric ($a^2$) on the side opposite to the cut piles (b) and drying, (B) a thermoplastic resin adhesive layer, and (C) a surface mat layer, wherein the surface mat layer (C) is adhered via the thermoplastic resin adhesive layer (B) to the reverse side mat layer (A) on the side of reverse side mat layer (A) on which the liquid resin adhesive has been coated, wherein the cut piles (b) are implanted under the following conditions:

Implanting density: 16 to 400 roots/$in^2$
Implanting pitch—gauge direction: 4 to 20 roots/in
   stitch direction: 4 to 20 roots/in
Pile height (h): 2 to 20 mm
Pile thickness: 20 to 1000 $\mu$m
Pile fineness: 800 to 6000 denier.

In a modified embodiment of the above-mentioned mat, cut piles (b) have their tips swollen by heat-melting so as to have an increased anchoring effect.

DETAILED DESCRIPTION OF THE INVENTION

Base fabric ($a^1$) of laminated mat (a) includes natural fibers, e.g., jute and hemp, and various synthetic resin fibers. From the standpoint of strength, cost, heat resistance, combustibility, and re-usability, plain weave fabric of polypropylene flat yarns is preferred. The flat yarns have a width usually of from 3 to 15 mm, and preferably of from 5 to 7 mm, and a thickness usually of from 18 to 100 $\mu$m, and preferably of from 20 to 30 $\mu$m.

Nonwoven fabric ($a^2$) made of a thermoplastic resin fibrous binder which is laminated on base fabric ($a^1$) and needled together therewith is nonwoven fabric comprising a thermoplastic resin fiber usually having a melting point or softening point of from 80° to 260° C., and preferably from 90° to 145° C., such as polyethylene fiber, polypropylene fiber, linear polyester fiber, polyamide fiber, and mixed fiber thereof. Preferably, nonwoven fabric ($a^2$) is made of a polypropylene fibrous binder. The fineness of the thermoplastic resin fiber is not particularly limited but is usually 2 denier or more. The fiber length is preferably 5 mm or longer for sufficient entanglement.

Nonwoven fabric ($a^2$) can be obtained by entangling the resin fibers by needle punching. A fibrous web obtained by, for example, carding or a binder-bound fibrous sheet may also be used. Further, nonwoven fabric ($a^2$) may be obtained by melting pellets of polypropylene, polyester, polyamide, etc. in an extruder, spinning the melted material through a die having a number of fine nozzles, air drying the individual spun filaments, laying the filaments on a screen below the die, and taking off the filaments with a winder. Nonwoven fabric ($a^2$) usually has a basis weight of from 30 to 600 g/m², and preferably from 30 to 300 g/m².

The above-described nonwoven fabric has many vacant space allowing water passage. Commercially available products which can be used as nonwoven fabric ($a^2$) include the series of "Meltron W" produced by Diabond Kogyo Co., Ltd. (PAY-200 and PAS-200 as a polyamide type; ES-500 as a polyester type; Y-7 as an ethylene-vinyl acetate copolymer type), the series of "Syntex" produced by Mitsui Petrochemical Industries, Ltd. (PK-103, PK-106, PK-404, and PK-408 as a polypropylene type), the series of "Adomel" for a polyester type produced by Mitsui Petrochemical Industries Ltd., and the series of "DYNAC" produced by Kureha Seni Co., Ltd. (LNS-1000, LNS-2000, B-1000, B-2000, and B-3000).

Figure 2:
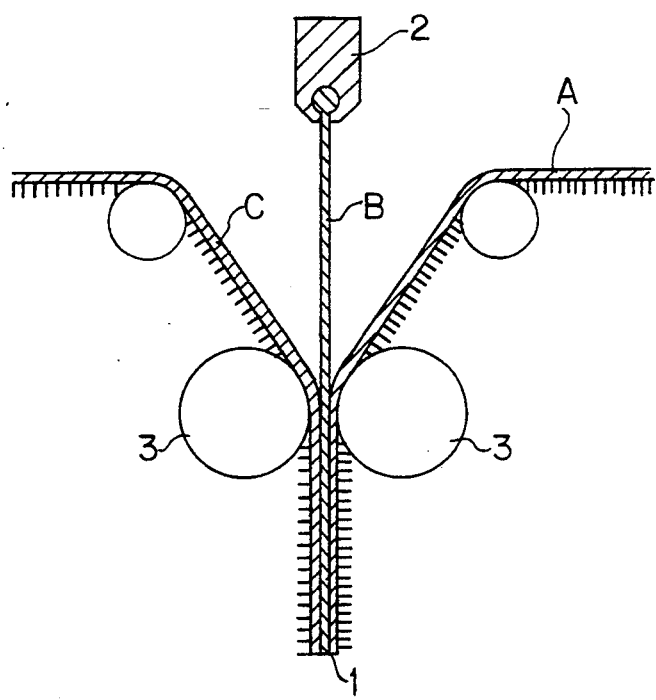
FIG. 2 schematically illustrates the step of laminating (A) a reverse side mat layer and (C) a surface mat layer with (B) an adhesive resin film therebetween.

It is preferable that nonwoven fabric ($a^2$) has a melting point lower than the extrusion temperature of thermoplastic resin film (B) hereinafter described by at least 10° C. When surface mat layer (C) is laminated on reverse side mat layer (A) using melt-extruded thermoplastic resin film (B) while hot as an adhesive as shown in FIG. 2, nonwoven fabric ($a^2$) having a melting point at least 10° C. lower than thermoplastic resin film (B) is melted by the heat of film (B) and thereby firmly adhered to film (B).

Base fabric ($a^1$) and nonwoven fabric ($a^2$) are laminated and united or entangled by needling to form laminated mat (a). Laminating of base fabric ($a^1$) and nonwoven fabric ($a^2$) can be carried out merely by putting one on the other. Since subsequent needling is generally carried out from the side of nonwoven fabric ($a^2$) as hereinafter described, base fabric ($a^1$) usually comes to the lower side of laminated mat (a) with nonwoven fabric ($a^2$) as an upper layer.

Needling of the resulting laminate is conducted by piercing 80 to 300 needles per square inch of the laminate preferably in the vertical direction until the binder fiber of nonwoven fabric ($a^2$) is entangled with the whole of base fabric ($a^1$) and is not easily separated therefrom. The needle may be pierced from either side of the laminate but is preferably from the side of nonwoven fabric ($a^2$). In this case, the binder fiber of nonwoven fabric ($a^2$) laminated on one side of base fabric ($a^1$) is brought by a needle to reach to the other side of base fabric ($a^1$) where it is entangled with the binder fiber having been brought there to accomplish firm uniting of base fabric ($a^1$) and nonwoven fabric ($a^2$) to form laminated mat (a). By the needling, from 3 to 50%, and preferably from 10 to 35%, by weight of the binder fiber is brought from one side of base fabric ($a^1$) to the opposite side.

Where nonwoven layer ($a^2$) is an upper layer with base fabric ($a^1$) being a lower layer, and needles are stuck from the upper side, laminated mat (a) thus prepared actually has a three-layered structure composed of an upper fibrous binder nonwoven layer ($a^2$) (30 to 540 g/m², preferably 30 to 150 g/m), base fabric ($a^1$) as an interlayer, and a lower fibrous binder nonwoven fabric ($a^2$) (10 to 300 g/m², preferably 10 to 150 g/m²).

Figure 1:
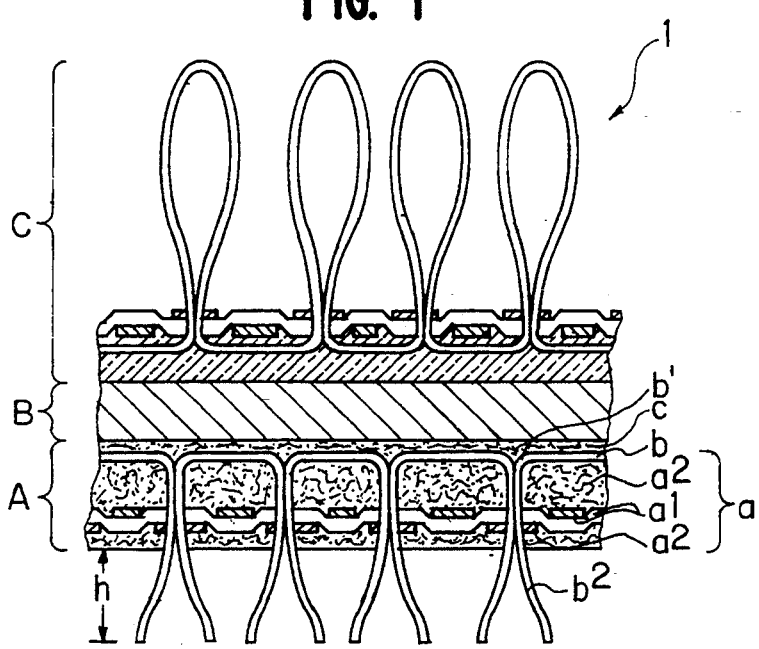
FIG. 1 is a cross section of the mat according to the present invention.

Pile yarns are implanted into laminated mat (a) in such a manner that the cut ends ($b^2$) of piles (b) extending from the reverse side of laminated mat (a) may stick deep into piles of a carpet laid beneath so as to prevent sliding of the mat on the carpet. Piles (b) may pierce into piles of a carpet either vertically or obliquely. It is also important that piles (b) should have moderate rigidity and be implanted at appropriate intervals at an appropriate density so as not to bend easily upon receipt of a sliding force. With these requirements being taken into consideration, piles (b) on the reverse side of laminated mat (a) are required to satisfy the following conditions:

Pile height (h): 2 to 20 mm, preferably 4 to 10 mm.
Pile fineness: 800 to 6000 denier, preferably 1200 to 4000 denier The terminology "pile height" as used herein means the length of the pile projecting over the reverse side of laminated mat (a) as indicated in FIG. 1. In other words, a "pile height" is a length of a pile which can deeply pierce the pile layer of a carpet laid beneath.

Cut piles (b) may be made of a monofilament, a flat yarn, or a bundle thereof, and preferably a flat yarn having the following properties:

Pile height: 4 to 10 mm
Pile width: 1 to 12 mm, preferably 3 to 8 mm
Pile thickness: 20 to 80 μm
Pile fineness: 1200 to 4000 denier Suitable materials of cut piles (b) include synthetic resins having a flexural modulus of from 7,500 to 110,000 kg/cm², and preferably from 11,000 to 40,000 kg/cm², such as polypropylene, high-density polyethylene, linear polyester, polyvinyl chloride, polyvinylidene chloride, and linear nylon. From the standpoint of re-usability and non-pollution combustibility, polypropylene and high-density polyethylene are preferred, and crystalline polypropylene yarns are particularly preferred. It is desirable to use the same material as base fabric ($a^1$).

Pile yarns (b) can be implanted into laminated mat (a) by sticking a threaded needle into laminated mat (a) from either side thereof, hooking the yarn appearing on the other side of laminated mat (a), and pulling the needle back to make loops by means of a tufting machine, a pile loom, a Wilton loom, a pile knitting loom, etc. The loops are then cut to form cut piles. The needle is usually stuck from the side of nonwoven fabric ($a^2$) having a higher bulk density.

Implantation of pile yarn (b) is carried out under the following conditions:

Implanting density: 16 to 400 roots/in² (preferably 25 to 169 roots/in²)
Implanting pitch:
  Stitch direction: 4 to 20 roots/in (preferably 5 to 13 roots/in)
  Gauge direction: 4 to 20 roots/in (preferably 5 to 13 roots/in)

The terminology "root" as used herein means a stitch. In the embodiments shown in FIGS. 1 and 2, two cut pile yarns are included per root.

If the implanting conditions are out of the above-recited broad ranges, the resulting mat easily slides on a carpet. It is preferable that the implanting pitch in the stitch direction and that in the gauge direction are the same.

Pile yarns (b) implanted in laminated mat (a) are then fixed with a liquid resin adhesive. A liquid resin adhesive is coated on the roots ($b^1$) of piles (b), impregnated into nonwoven fabric ($a^2$), and dried to solidify to form resin adhesive layer (c).

The liquid resin adhesive includes an aqueous resin emulsion, a solvent type resin adhesive, and a water-soluble acrylic resin adhesive each having a glass transition point (Tg) of from $-65°$ to $130°$ C. and comprising an aqueous or organic medium having dispersed therein resin particles having an average particle size of from 0.01 to 5 $\mu$m, and preferably from 0.05 to 1.5 $\mu$m. Resin adhesive layer (c) in reverse side mat layer (A) corresponds to the solid resin content of the liquid resin adhesive left after drying to remove the aqueous or organic solvent.

In order to dry at room temperature and to prevent fall-off of the piles in the early stage, it is preferable to use an aqueous resin emulsion having a Tg of from $-40°$ to $+30°$ C., and particularly from $0°$ to $+25°$ C. In using an aqueous resin emulsion having a high Tg, the adhesive is force dried in a heater oven or hot air oven.

Suitable aqueous resin emulsions, inclusive of latices, include those of a styrene-butyl acrylate-acrylic acid copolymer, an n-butyl acrylate-styrene-itaconic acid copolymer, an acrylonitrile-butyl acrylate-N-methylol methacrylamide copolymer, a 2-ethylhexyl acrylate-methyl methacrylate-itaconic acid copolymer, an n-butyl acrylate-acrylamide copolymer, a 2-hydroxyethyl acrylate-acrylamide copolymer, a styrene-butadiene copolymer rubber, an ethylene-vinyl acetate copolymer, a vinyl chloride-vinylidene chloride copolymer, and a vinyl chloride-butyl acrylate copolymer.

A cold-crosslinking resin aqueous emulsion having a Tg of not higher than $20°$ C. comprising an aqueous emulsion of a carbonyl-containing copolymer resin and a hydrazine derivative having at least two hydrazine residues ($-NH.NH_2$) as described in JP-B-63-51180, JP-B-1-13501, JP-B-1-45497, and JP-B-3-7227 (the term "JP-B" as used herein means an "examined published Japanese patent application") can also be used as a liquid resin adhesive.

Specific examples of the carbonyl-containing copolymer resin are an acrolein-styrene-n-butyl acrylate-acrylic acid copolymer, an acrolein-styrene-n-butyl acrylate-acrylic acid-acrylamide copolymer, a diacetonacrylamide-styrene-methyl methacrylate-2-ethylhexyl acrylate-acrylic acid copolymer, and a vinyl methyl ketone-styrene-ethyl acrylate-itaconic acid copolymer.

Specific examples of the hydrazine derivative are adipic acid dihydrazide, sebacic acid dihydrazide, isophthalic acid dihydrazide, and maleic acid dihydrazide. The hydrazine derivative is added in an amount of from 0.02 to 1 mol per mol of the carbonyl group of the carbonyl-containing copolymer.

If desired, a liquid resin adhesive such as the resin emulsion may contain various fillers for imparting massiveness to the resulting mat, such as extender pigments, e.g., calcium carbonate, aluminum hydroxide, clay, talc, and barium sulfate, pigments, e.g., rose bengale and titanium oxide, flame-retardants, dyes, iron powder, iron oxide, and ferrite.

Coating of the liquid resin adhesive is usually carried out by roll coating, spray coating, etc. The adhesive layer is dried at room temperature or by heating in an infrared heater, a suction dryer, a hot air dryer, etc.

Since the liquid resin adhesive has impregnated into nonwoven fabric ($a^2$) entangled with base fabric ($a^1$), resin adhesive layer (c) is integrally united with base fabric ($a^1$). Since pile yarns (b) implanted into laminated mat (a) are thus fixed with the adhesive resin particles impregnated into the mat and with resin adhesive layer (c) formed by the drying of the adhesive coated on pile roots ($b^1$), they are prevented from falling off and also are held almost vertically so as to be stuck into the inside of the pile layer of a carpet laid beneath the mat without being bent. The impregnated resin solid content in laminated mat (a) desirably ranges from 50 to 500 g/m$^2$, and preferably from 70 to 300 g/m$^2$. If the resin solid content is less than 50 g/m$^2$, prevention of fall-off of the pile yarns cannot be expected. If it exceeds 500 g/m$^2$, the elasticity of the mat is impaired.

Thermoplastic resin film (B) for melt-laminating surface mat layer (C) on the pile root side (i.e., the side on which the liquid resin adhesive has been coated) of reverse side mat layer (A) comprises a thermoplastic resin having a melting point of desirably from $90°$ to $168°$ C. Examples of suitable thermoplastic resin include an ethylene polymer having a melting point of $115°$ to $136°$ C. and a density of from 0.89 to 0.968 g/cm$^3$, an ethylene-vinyl acetate copolymer having a vinyl acetate content of from 3 to 15% by weight, a propylene polymer having a density of from 0.90 to 0.92 g/cm$^2$, an ethylene-acrylic acid copolymer, a metal salt (K$^+$, Li$^+$, Na$^+$, Zn$^{++}$, Al$^{+++}$) of an ethylene-methacrylic acid copolymer, and polyvinyl chloride. From the standpoint of prevention of air pollution, olefin polymers having a melting point of from $90°$ to $168°$ C., such as an ethylene polymer, a crystalline propylene polymer, an ethylene-vinyl acetate copolymer, an ethylene-acrylic acid copolymer, a metal salt of an ethylene-methacrylic acid copolymer, and atactic polypropylene having a softening point (DIN 52011) of from $80°$ to $130°$ C. are preferred.

Thermoplastic resin film (B) functions as both an adhesive layer and a waterproofing layer for preventing rainwater from penetrating into the carpet laid on the car floor.

Thermoplastic resin film (B) usually has a thickness of from 200 to 1000 $\mu$m, and preferably from 300 to 600 $\mu$m.

Examples of surface mat layer (C) which can be used in the present invention include needle-punched carpeting made of cotton, hemp, wool, nylon, polypropylene, polyacrylonitrile, cellulose acetate, polyethylene terephthalate, etc.; tufted carpeting comprising base knitted fabric made of polypropylene flat yarns on which piles of natural fibers, e.g., cotton, hemp, or wool, or synthetic fibers, e.g., polyamide or polyethylene terephthalate, are implanted; tufted carpeting comprising base fabric, such as the above-mentioned needle-punched carpet or spun-bonded nonwoven fabric, on which piles are implanted; a Dantsu carpet, a Wilton carpet, an Axminster carpet, and the like. In particular, the surface mat layer (C) may be a tufted or needle-punched carpet made of polypropylene fiber. In addition to the above-mentioned carpeting, other various decorative mats, such as a rubber mat, may also serve as surface mat layer (C).

Laminating of surface mat layer (C) on reverse side mat layer (A) can be carried out by facing the back side of surface mat layer (C) to resin adhesive layer (c) (dried) of reverse side mat layer (A) with heat-melted thermoplastic resin film (B) being inserted therebetween as shown in FIG. 2. More specifically, a thermoplastic resin is heat-melted in an extruder at a resin temperature of from $110°$ to $260°$ C., and preferably from $160°$ to $240°$ C., and extruded from die 2, and the extruded film (B), while in the molten state, is sandwiched in between layers (A) and (C) while passing through a pair of cooling and pressing rolls 3, 3 with applying pressure of 3 to 10 kg/cm$^2$G. On contact with molten thermoplastic resin film (B), nonwoven fabric (a$^2$) and, in some cases, the solid content of the liquid resin adhesive (c) are melted by the heat of thermoplastic resin film (B), to thereby obtain mat 1 having a structure of reverse side mat layer (A) [piles (b)/nonwoven fabric (a$^2$) having a lower bulk density/cloth made of polypropylene flat yarns for a base fabric (a$^1$)/nonwoven fabric (a$^2$) having a higher bulk density]/thermoplastic resin film (B)/surface mat layer (C).

Figure 3:
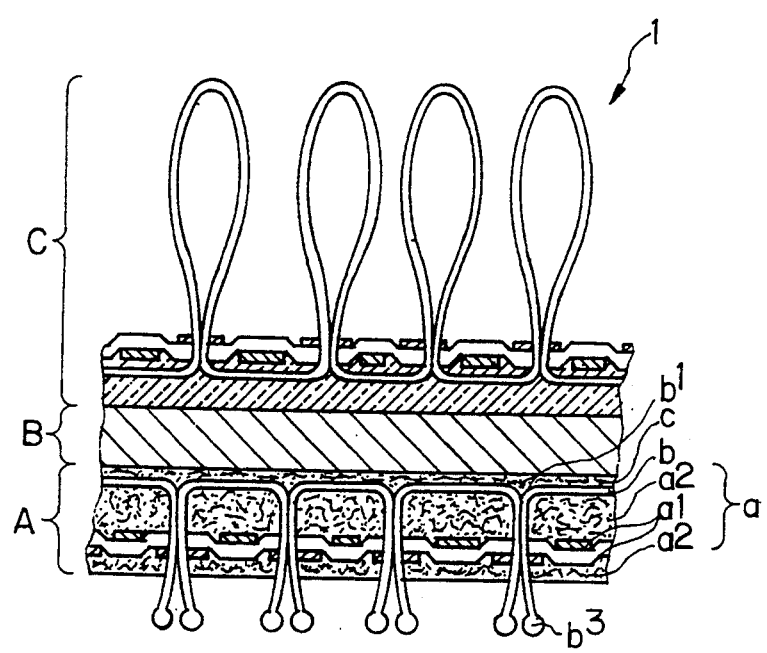
FIG. 3 is a cross section of a modified embodiment of the mat according to the present invention.

In a modified embodiment of the mat according to the present invention, the tips of cut piles (b) are swollen by heat-melting as shown in FIG. 3. In this embodiment, the anchoring effect of the cut piles to a carpet laid beneath can be further ensured. In more detail, the cut pile side of reverse side mat layer (A) is heated and melted by any heating means, such as a burner or an infrared heater, to swell the head of each pile yarn (b) to thereby form swollen head (b$^3$) having a diameter greater than the thickness or width of the root pile yarn (b$^1$).

Swollen head (b$^3$) of the pile yarns has a diameter 1.1 to 2 times greater, preferably 1.3 to 1.5 times greater, than the thickness of its root (b$^1$). Moreover, the above-mentioned heat treatment results in additional changes of pile forms. For example, the heads of pile yarns undergo partial shrinkage or bending, or some of the neighboring heads of pile yarns are fused together to form loops, or some of the neighboring pile yarns are fuse-bonded to have an increased strength. As a result, the pile yarn of reverse side mat layer (A) is complicatedly interlocked with the piles of a carpet laid beneath, such as a punch carpet, a loop carpet, and a cut pile carpet. Therefore, as the length of piles of the carpet laid beneath increases, and as the frequency of passage on the mat or rug or the frequency of being trampled down under foot increases, the mat becomes less movable out of the original position, thus excluding the necessity of putting the mat back to its original place.

The heat treatment of piles (b) on reverse side mat layer (A) may be conducted either before or after laminating surface mat layer (C) on reverse side mat layer (A) via thermoplastic resin film (B).

When the mat according to the present invention is spread or put on a carpet, such as punch carpet, a loop carpet, a cut pile carpet, etc., the tips of piles (b) of the mat stick into the inside of the pile layer of the carpet laid beneath, and the mat is prevented from sliding.

In particular, when the mat according to the modified embodiment of the present invention is put on a carpet, the swollen heads (b$^3$) of piles (b) are firmly anchored in the pile layer of the carpet so that a great force is needed to separate the mat apart from the carpet or to horizontally move the mat on the carpet. The longer the piles of the carpet beneath, or the greater the number of swollen heads (b$^3$), or the higher the frequency of being trampled down under foot, the greater the anchoring effect of the piles (b).

The present invention is now illustrated in greater detail with reference to Examples, but it should be understood that the present invention is not to be construed as being limited thereto. All the parts, percents and the like are by weight unless otherwise indicated.

The mats or rugs obtained in Examples and Comparative Examples were evaluated according to the following test methods.

1) Adhesion of Surface Mat Layer (C):

A specimen of 25 mm in width and 250 mm in length cut out of a mat was held at a span of 100 mm, and the peel strength between surface mat layer (C) and reverse side mat layer (A) (a peel angle: 180°) was measured by means of an Instron tester.

2) Shear Strength:

A mat was laid on a loop carpet or needle-punched carpet. After a load of 100 g/cm$^2$ was applied on the entire surface of the mat for 30 seconds, the mat was pulled in the horizontal direction at a pulling speed of 100 mm/sec. The stress at which sliding initiated was measured.

3) Peel Strength:

A mat was laid on a commercially available loop carpet or needle-punched carpet. After a load of 100 g/cm$^2$ was applied on the entire surface of the mat for 30 seconds, the mat was pulled at an angle of 90°. The stress at which the mat began to be separated apart from the carpet was measured.

EXAMPLE 1

Nonwoven fabric made of a polypropylene fibrous binder (melting point: about 167° C.; basis weight: 100 g/m$^2$; fineness: 16 denier) was laid on base fabric plainwoven of polypropylene flat yarns of 6 mm in width and 20 μm in thickness. The laminate was needled 150 times per square inch from the nonwoven fabric side. As a result, the fiber of the nonwoven fabric appeared on the other side of the laminate, and the fibers of the nonwoven fabric and base fabric were entangled with each other to obtain a laminated mat comprising the base fabric having on both sides thereof the fiber of the nonwoven fabric.

A polypropylene split yarn (melting point: about 167° C.) having a width of 4.7 mm and a fineness of 1200 denier was stuck into the laminate mat from the side on which the nonwoven fabric had been laid at a pitch of 8 roots/inch in the gauge direction and 8 roots/inch in the stitch direction (pile density: 64 roots/in$^2$). The loops of the pile were cut. The cut pile yarns had a height of about 6 mm. These values are listed in Table 1 below.

A cold-temperature crosslinking acrylic resin emulsion "YJ 2720" produced by Mitsubishi Yuka Badische Co., Ltd. (Tg: 0° C.; resin solid content: 48%; resin particle size: 0.8 μm) was coated on the tufted mat on the side opposite to the cut piles to a resin solid coverage of 130 g/m$^2$ and dried to obtain reverse side mat layer (A).

A tufted carpet having loop piles made of polypropylene (basis weight: 1000 g/m$^2$) as surface mat layer (C) was faced with reverse side mat layer (A) with the piles of both layers (A) and (C) outward. Ethylene-acrylic acid copolymer film (B) (melting point: about 105° C.) having a thickness of 320 μm was melted at 200° C. and introduced between layers (A) and (C), and the three layers were bonded by compression between rolls 3, 3 at pressure of 5 kg/cm$^2$ G.

The resulting laminated web was cut to a size of 50 cm wide and 70 cm long to obtain a mat for a car. The mat was put on a roop-tufted floor carpet of a car (i.e., VISTA or CAMRY manufactured by Toyota Motor Corporation) before the driver's seat. The mat did not slide during driving.

When water was poured on the surface of the mat from the height of 50 cm, water ran on the mat and fell in drops from the edges without being percolated through the mat.

The pull strength of the cut pile yarns was 3.8 kg/root (i.e., the strength required for pulling out two pile yarns from one root as shown in FIG. 1).

The shear strength of the mat when put on various commercially available carpets is shown in Table 2 below.

EXAMPLE 2

A mat was prepared in the same manner as in Example 1, except that a polypropylene split yarn having a width of 4.7 mm and a fineness of 1600 denier was implanted into the laminate mat at a pitch of 8 roots/inch in the gauge direction and 5.2 roots/inch in the stitch direction (pile density: 41.6 roots/in$^2$). The cut pile had a height of 5 mm.

The performance properties of the resulting mat are shown in Table 2.

EXAMPLES 3 AND 4

A mat was prepared in the same manner as in Example 1, except that the polypropylene split yarn shown in Table 1 below was implanted under the conditions shown. In Example 4, a bundle consisting of 8 monofilaments was used as a pile yarn. The performance properties of the resulting mat are shown in Table 2.

COMPARATIVE EXAMPLE 1

A commercially available mat composed of a surface mat layer having polypropylene cut piles on the surface thereof and having laminated on the reverse side thereof a 2.5 mm thick polyvinyl chloride sheet having truncated corns (height: 3.5 mm; bottom diameter: 3.2 mm; top diameter: 2 mm) at a pitch of 10 mm (i.e., a mat for ACCORD manufactured by Honda Motor Co., Ltd.) was evaluated in the same manner as in the foregoing Examples. The results obtained are shown in Table 2.

EXAMPLE 5

A mat was prepared in the same manner as in Example 1, except for replacing the cold-crosslinking acrylic resin emulsion "YJ 2720" with a cold-crosslinking acrylic resin emulsion prepared as follows.

Preparation of Crosslinking Resin Emulsion:

The following components were charged in a reactor equipped with a temperature controller, an anchor type stirrer, a reflux condenser, feeders, a thermometer, and a pipe for nitrogen introduction.

| | |
|---|---|
| Water | 200 parts |
| 35% aqueous solution of sodium salt of ethylene oxide (20 mols)-adduct of p-nonyl phenol hemisulfate (anionic emulsifying agent) | 5 parts |
| 20% aqueous solution of ethylene oxide (25 mols)-adduct of p-nonylphenol (nonionic emulsifying agent) | 20 parts |

Separately, Mixture I and Solution II were prepared from the following components:

| Mixture I: | |
|---|---|
| Water | 200 parts |
| The same anionic emulsifying agent as described above (35% aqueous solution) | 25 parts |
| Styrene | 242 parts |
| n-Butyl acrylate | 227 parts |
| Acrolein | 11 parts |
| Acrylic acid | 10 parts |
| Acrylamide | 10 parts |
| Solution II: | |
| Water | 85 parts |
| Potassium persulfate | 2.5 parts |

A 1/10 portion of Mixture I was fed into the reactor. After heating the mixture to 90° C., a 1/10 portion of Solution II was added thereto. Then, the rest of Mixture I and the rest of Solution II were simultaneously added in small drop state over a period of 3 to 3.5 hours. After the addition, the reaction system was allowed to further react for 1.5 hours while maintaining the temperature at 90° C. The reaction mixture was cooled to room temperature and adjusted to a pH of 7 to 8 with aqueous ammonia. The resulting copolymer aqueous dispersion had a concentration of 49.5%.

10 parts of adipic acid dihydrazide was added to 500 parts of the resin dispersion to obtain a cold-crosslinking acrylic resin aqueous emulsion.

The cut pile side of the resulting mat was burnt with the flame of a burner, whereupon the tips of cut piles were melted to a length of 2 to 4 mm and shrunk to form swollen heads having a greater diameter than the original pile yarn thickness.

The adhesive strength between surface mat layer (C) and reverse side mat layer (A) was 5.48 kg/25 mm.

The resulting laminated web was cue to a width of 50 cm and a length of 70 cm to obtain a mat for a car. The mat was put on a floor carpet of a car before the driver's seat. The mat did not slide during driving.

When water was poured on the surface of the mat from the height of 50 cm, water ran on the mat and fell in drops from the edges without being percolated through the mat.

The pull strength of the cut pile yarns was 3.8 kg/root or higher.

The shear strength and peel strength of the mat when put on various commercially available carpets are shown in Table 2.

EXAMPLE 6

A mat was prepared in the same manner as in Example 5, except that a polypropylene split yarn having a width of 4.7 mm and a fineness of 1600 denier was implanted into the laminate mat at a pitch of 8 roots/inch in the gauge direction and 5.2 roots/inch in the stitch direction (pile density: 41.6 roots/in$^2$). The cut pile had a height of 5 mm.

The performance properties of the resulting mat are shown in Table 2.

TABLE 1

| | Example 1 | Example 2 | Example 3 | Example 4 | Example 5 | Example 6 |
|---|---|---|---|---|---|---|
| Pile Yarn: | | | | | | |
| Width (mm) | 4.7 | 4.7 | 6 | 12 | 4.7 | 4.7 |
| Thickness (μm) | 32 | 40 | 42 | 40 | 32 | 42 |
| Fineness (g/9000 m) | 1200 | 1600 | 2050 | 3900 | 1200 | 1600 |
| Implantation Condition: | | | | | | |

TABLE 1-continued

|  | Example 1 | Example 2 | Example 3 | Example 4 | Example 5 | Example 6 |
| --- | --- | --- | --- | --- | --- | --- |
| Pile Density (root/in$^2$) | 64 | 41.6 | 100 | 16 | 64 | 41.6 |
| Pitch (root/in): |  |  |  |  |  |  |
| Gauge direction | 8 | 8 | 10 | 4 | 8 | 8 |
| Stitch direction | 8 | 5.2 | 10 | 4 | 8 | 5.2 |
| Cut Pile Height (mm) | 6 | 5 | 8 | 7 | 6 | 5 |
| Heat Treatment of Piles | not done | not done | not done | not done | done | done |

TABLE 2

|  | Example 1 | Example 2 | Example 3 | Example 4 | Example 5 | Example 6 | Compara. 1 |
| --- | --- | --- | --- | --- | --- | --- | --- |
| Pull Strength of Pile Yarns (kg/root) | 3.8 | 3.9 | 3.2 | 3.8 | 3.8 | 3.9 | — |
| Adhesive Strength of Surface Mat Layer (kg/25 mm) | 5.48 | 5.52 | 4.75 | 2.92 | 5.48 | 5.52 | — |
| Shear Strength of Mat (g/cm$^2$): |  |  |  |  |  |  |  |
| On loop carpet* (lengthwise/crosswise) | 390/370 | 360/325 | 390/380 | 240/230 | 630/870 | 1400/1520 | 190/180 |
| On needle-punched carpet** (lengthwise/crosswise) | 540/470 | 520/440 | 560/480 | 325/315 | 1360/3380 | 3490/3910 | 260/250 |
| Peel Strength of Mat (g/50 mm): |  |  |  |  |  |  |  |
| On loop carpet* (lengthwise/crosswise) | 0/0 | 0/0 | 0/0 | 0/0 | 225/205 | 295/475 | 0/0 |
| On needle-punched carpet** (lengthwise/crosswise) | 0/0 | 0/0 | 0/0 | 0/0 | 667/751 | 955/1226 | 0/0 |

*: A floor carpet of VISTA or CAMRY manufactured by Toyota Motor Corporation
**: A floor carpet of ACCORD manufactured by Honda Motor Co., Ltd.

EXAMPLE 7

Nonwoven fabric made of a polyethylene fibrous binder (melting point: about 115° C.; basis weight: 50 g/m$^2$; fineness: 16 denier) was laid on base fabric plain-woven of high-density polyethylene flat yarns of 3 mm in width and 39 μm in thickness. The laminate was needled 100 times per square inch from the nonwoven fabric side. As a result, the fiber of the nonwoven fabric appeared on the other side of the laminate, and the fibers of the nonwoven fabric and base fabric were interlocked with each other to obtain a laminated mat comprising the base fabric having on both sides thereof the fiber of the nonwoven fabric.

A polypropylene split yarn (melting point: about 167° C.) having a width of 4.7 mm and a fineness of 800 denier was stuck into the laminate mat from the side on which the nonwoven fabric had been laid at a pitch of 8 roots/inch in the gauge direction and 8 roots/inch in the stitch direction (pile density: 64 roots/in$^2$). The loops of the pile were cut. The cut piles had a height of about 7 mm.

An n-butyl acrylate-styrene-itaconic acid copolymer emulsion (Tg: −10° C.; resin solid content: 50%; resin particle size: 1.0 μm) was coated on the tufted mat on the side opposite to the cut piles to a resin solid coverage of 150 g/m$^2$ and dried to obtain reverse side mat layer (A).

The cut pile side of the resulting mat was burnt with the flame of a burner, whereupon the tips of cut piles were melted to a length of 2 to 4 mm and shrunk to form swollen heads having a greater diameter than the original pile yarn thickness.

A wool-made Dantsu carpet (basis weight: 2000 g/m$^2$) as surface mat layer (C) was faced with reverse side mat layer (A) with the piles of both layers (A) and (C) outward. Ethylene-vinyl acetate copolymer film (B) (melting point: about 108° C.) having a thickness of 400 μm was melted at 180° C. and introduced between layers (A) and (C), and the three layers were united by compression between rolls at pressure of 7 kg/cm$^2$ G to prepare a rug.

The rug was put on the floor of a living room before a sofa, the floor wall-to-wall covered with a tufted carpet made by Toa Wool Spinning & Weaving Co., Ltd. With running about on the rug, no sliding of the rug occurred.

As described above, the mat or rug according to the present invention has rigid cut piles on the reverse side thereof so that the cut piles stick deep into the pile fiber of a carpet laid beneath. Even with a shear action applied to the mat or rug, the cut piles keep sticking into the piles of the carpet without bending to thereby prevent sliding of the mat. Requiring no peel strength, the mat put on a carpet can be easily removed therefrom without causing any damage to the carpet.

In a modified embodiment of the present invention in which the cut piles on the reverse side have swollen heads, a greatly increased anchoring effect can be obtained.

Further, the thermoplastic resin adhesive film provided between the reverse side mat layer and the surface mat layer prevents penetration of water. Because of this waterproofing effect as well as easy removability and non-sliding properties, the mat of the present invention is suitable for use on a carpeted automobile floor.

Since the cut piles on the reverse side are firmly adhered with the nonwoven fibrous binder and an emulsion resin adhesive, they do not pull out even when a shearing force is applied.

While the invention has been described in detail and with reference to specific examples thereof, it will be apparent to one skilled in the art that various changes and modifications can be made therein without departing from the spirit and scope thereof.

What is claimed is:

1. A mat having a laminate structure comprising:
  (A) a reverse side mat layer comprising
    (a1) a laminated mat of a base fabric and a nonwoven fabric made of a thermoplastic resin fibrous binder, wherein said base fabric and nonwoven fabric are united by needling;

(a2) cut pile tufts made of a thermoplastic resin implanted into said laminated mat such that said cut pile tufts protrude out of the base fabric; and (a3) a resin adhesive layer formed by coating a liquid resin adhesive on said nonwoven fabric on the side opposite to said cut pile tufts and drying;

(B) a thermoplastic resin adhesive layer; and (C) a surface mat layer;

wherein the surface mat layer is adhered via the thermoplastic resin adhesive layer to said reverse side mat layer on the side of the reverse side mat layer having said liquid resin adhesive coating; wherein the cut pile tufts are of a monofilament, a flat yarn, or a bundle thereof; wherein the cut pile tufts are made of a synthetic resin having a flexural modulus of from 7,500 to 110,000 kg/cm$^2$; and wherein the cut pile tufts are implanted under the following conditions:

Implanting density: 16 to 400 roots/in$^2$
Implanting pitch—gauge direction: 4 to 20 roots/in
stitch direction: 4 to 20 roots/in
Pile height: 2 to 20 mm
Pile thickness: 20 to 1000 μm, such that the pile thickness corresponds to a pile fineness of 800 to 6000 denier.

2. A mat as claimed in claim 1, wherein said base fabric is fabric woven of polypropylene flat yarns.

3. A mat as claimed in claim 1, wherein said cut pile tufts are crystalline polypropylene yarns.

4. A mat as claimed in claim 1, wherein said nonwoven fabric is nonwoven fabric made of a polypropylene fibrous binder.

5. A mat as claimed in claim 1, wherein said surface mat layer is a tufted or needle-punched carpet made of polypropylene fiber.

6. A mat as claimed in claim 1, wherein said thermoplastic resin adhesive layer is a film having a thickness of from 300 to 600 μm comprising an olefin resin having a melting point of from 90° to 168° C. which is selected from the group consisting of an ethylene polymer, a crystalline propylene polymer, an ethylene-vinyl acetate copolymer, an ethylene-acrylic acid copolymer, a metal salt of an ethylene-methacrylic acid copolymer, and atactic polypropylene having a softening point of from 80° to 130° C.

7. A mat as claimed in claim 1, wherein said liquid resin adhesive is (1) an aqueous resin emulsion having a glass transition point of from −40° to +30° C., the resin being selected from the group consisting of a styrene-butyl acrylate-acrylic acid copolymer, an n-butyl acrylate-styrene-itaconic acid copolymer, an acrylonitrile-butyl acrylate-N-methylol methacrylamide copolymer, a 2-ethylhexyl acrylate-methyl methacrylate-itaconic acid copolymer, an n-butyl acrylate-acrylamide copolymer, a 2-hydroxyethyl acrylate-acrylamide copolymer, a styrene-butadiene copolymer rubber, an ethylene-vinyl acetate copolymer, a vinyl chloride-vinylidene chloride copolymer, and a vinyl chloride-butyl acrylate copolymer, or (2) a cold-crosslinking resin aqueous emulsion having a glass transition point of not higher than 20° C. comprising an aqueous emulsion of a carbonyl-containing copolymer resin and a compound having at least two hydrazine groups.

8. A mat as claimed in claim 1, wherein said cut pile tufts have their tips swollen by a heat treatment.

9. A mat as claimed in claim 8, wherein said swollen tips have a diameter which is 1.1 to 2 times that of the roots of the cut pile tufts.

10. A mat as claimed in claim 1, wherein said nonwoven fabric has a basis weight of from 30 to 600 g/m$^2$.

11. A mat as claimed in claim 1, wherein said needling is carried out in the direction perpendicular to said laminated mat at a rate of from 80 to 300 stitches per square inch.

12. A mat as claimed in claim 1, wherein said liquid resin adhesive coated on said laminated mat has a solid resin content of from 50 to 500 g/m$^2$.

13. A mat as claimed in claim 1, wherein the pile height is 4 to 10 mm.

14. A mat as claimed in claim 1, wherein the pile fineness is 1200 to 4000 denier.

15. A mat as claimed in claim 1, wherein the cut pile tufts are made of a flat yarn having a pile height of from 4 to 10 mm, a pile width of from 1 to 12 mm, a pile thickness of from 20 to 80 μm, and a pile fineness of from 1200 to 4000 denier.

16. A mat as claimed in claim 15, wherein the pile width is from 3 to 8 mm.

17. A mat as claimed in claim 1, wherein the implanting pitch is 5 to 13 roots/inch in the gauge direction and 5 to 13 roots/inch in the stitch direction.

18. A mat as claimed in claim 1, wherein the implanting pitch in the stitch direction and the implanting pitch in the gauge direction are the same.

* * * * *